3,027,336
POROUS, HYDROPHILIC ACRYLIC RESIN STRUCTURE AND METHOD FOR PREPARING SAME
Franz Götz and Günther Will, Darmstadt, and Helmuth Will, Hanau, Germany, assignors to Röhm & Haas G.m.b.H., Darmstadt, Germany
No Drawing. Filed Mar. 7, 1958, Ser. No. 719,711
Claims priority, application Germany Mar. 9, 1957
11 Claims. (Cl. 260—2.5)

This invention relates to porous, hydrophilic resin structures, to surgical dressings, particularly of the immobilizing type, orthopedic supports, and like objects, that have the advantages of being porous, penetrable by X-rays, relatively light in weight and strong, and to methods for their preparation.

This application is a continuation-in-part of application Serial No. 669,432, filed July 2, 1957, now abandoned.

The preparation of synthetic resin structures by polymerization of a monomeric compound containing a polymer in dissolved or swollen condition is well known and is used extensively in the dental art. The products so prepared, e.g., organic glass having a methacrylate base, are usually insoluble in and repellant to water. Mixtures of polymethylmethacrylate and methylmethacrylate which, by way of example, are commonly used in dental prosthesis, are incompatible with the skin, cannot be washed off with water, and therefore require special precautions when frequent or continuous handling thereof is necessary.

It is also well known that for the past approximately one hundred years, plaster of Paris has been used almost exclusively in the preparation of surgical dressings designed to immobilize a portion of the body, e.g., a wrist, arm, leg, neck, etc., to permit undisturbed healing. It is generally acknowledged that the use of plaster of Paris for this and ancillary purposes has certain undesirable characteristics. The material is relatively heavy and, unless applied in considerable bulk, leaves much to be desired in so far as its mechanical strength is concerned. Furthermore, plaster of Paris casts are impervious to moisture and X-rays, thus making such supports uncomfortable and interfering seriously with the utility of X-ray machines as tools for determining whether a fracture has healed. Despite these drawbacks, plaster of Paris is still used almost exclusively in the preparation of immobilizing surgical dressings.

Some efforts have been made to provide immobilizing surgical dressings and the like that are lighter in weight and possess other more desirable characteristics. Thus, for example, it has been proposed to soften sheets of plastic materials and apply them to the part of the body to be immobilized so as to set, upon cooling, to a desired position. Unfortunately, however, the temperature to which such thermoplastic materials must be raised to make them moldable is too high to be endured by a patient unless an insulating intermediate layer is first applied to the part to be immobilized. This, in turn, has the disadvantage of making it difficult to mold or shape the plastic material satisfactorily to the part of the body to which it is applied and requires considerable skill if it is to be done with any adequate precision in the limited time that is available before rehardening. Neither this method nor any of the other methods heretofore suggested for making hardening dressings have met with any appreciable success.

It has now been found that porous resin structures whihc are hydrophilic in the sense that they are compatible with and capable of absorbing aqueous liquids and hydrophilic liquids such as water-miscible alcohols, can readily be prepared by hardening a mixture of polymeric material, polymerizable monomer and pore-forming material under conditions favorable to polymerization of the monomer in the mixture. Such resin structures are suitable for a variety of uses, e.g., in the production of models, toys, linings and shaped articles generally. Porous surgical dressings, orthopedic supports, and like objects, can readily be prepared by forming a viscous mixture of polymeric material, pore-forming material, polymerizable monomer and polymerization catalyst therefor, shaping the mixture to a preselected contour, and permitting it to harden to a porous structure by substantially concurrent monomer polymerization and pore formation.

The polymeric material contained in the mixture can be any polymer or combination of polymers that is physiologically compatible and which can be dissolved, dispersed or otherwise distributed in the monomer. Methylmethacrylate polymers are particularly desirable as polymer components. Other polymers and copolymers, however, are also suitable, e.g., those having a base of vinyl chloride, vinylidine chloride, vinyl acetate, styrene, acrylic or methacrylic compounds. In addition, polyesters and other materials of high molecular weight that are soluble or otherwise dispersible in monomeric polymerizable compounds, e.g., cellulose esters and ethers, may also be employed. Polymers that are soluble or swellable in the mixture and contain carboxylic acid groups, whether used alone or in combination with other polymers, are particularly desirable because of their contribution to the hydrophilic properties of the ultimate product and their activity in promoting pore formation in conjunction with other materials.

The identity of the monomeric polymerizable material in the mixture will of course depend upon the identity of the polymeric material inasmuch as the two should be compatible and the polymer is to be distributed in the monomer. Monomeric methylmethacrylate is typical of monomers that can be used advantageously in the method of the invention.

The term "pore-forming material" as used herein is intended to include any material or combination of materials capable of producing pores in the ultimate structure of the dressing, support or other object formed in accordance with the method of the invention. An aqueous liquid such as water or a mixture of water with a low molecular weight alcohol, e.g., methanol, is a most effective agent for forming pores when used in conjunction with a dispersing material such as a polymer containing carboxylic acid groups, e.g., acrylic or methacrylic acid, that is capable of distributing the aqueous liquid throughout the mixture. In the preparation of surgical dressings the use of an aqueous liquid is advantageous because it absorbs the exothermic heat of polymerization and is therefore effective in reducing the sensible temperature during polymerization to a minimum. At least some of the water and/or alcohol used as pore-forming agent is evaporated or otherwise expelled during polymerization and thereby leaves voids in the hardening and ultimately hardened casting. An additional advantage that is inherent in the use of water or other hydrophilic pore-forming agent in forming surgical dressings and the like is that the final dressing is likewise hydrophilic and therefore capable of absorbing water, thus making the dressing capable of absorbing secretions from wounds, perspiration and in general giving it the ability to "breathe." Another advantage derived from the use of water or water and alcohol as a pore-forming agent is that the mixture will not adhere permanently to the skin and that it may be worked before it sets, thus permitting shaping to conform more precisely to the contours of the part of the body that is to be immobilized.

The pore-forming material may also be a water-charged filler, such as a hydrate, e.g., aluminum sulfate, which upon expulsion of its water content is susceptible to rehydration, or a compound capable of swelling in water, dissolving colloidally in water, or otherwise capable of absorbing relatively large quantities of water. Fillers of the latter type include gelatins, alginic acids, cellulose ethers and colloidal silica.

It is also within the scope of the invention to use an inert gas, such as nitrogen or carbon dioxide, as a pore-forming material. The gas may be physically introduced into the viscous mixture by ordinary foaming methods, it may be generated in situ by interaction of two or more components of the mixture, it may be generated from a compound, e.g., azodiisobutyrodinitrile, incorporated into the mixture by subsequent heating, or it may be generated by vaporization of an incorporated compound while the mass is in a thermoplastic condition. Thus, for example, the pore-forming material may comprise a mixture of a salt containing carbonic acid and an acid or acidic compound such as aluminum sulfate. When these components react they generate carbon dioxide which forms pores in the composition as polymerization proceeds and the mixture hardens. Alkali metal carbonates have been found particularly effective as carbonic acid-containing salts and various acids that are physiologically compatible are suitable. Copolymers derived at least in part from acrylic acid or methacrylic acid are particularly suitable for this purpose and have the additional advantage of promoting uniform diffusion of water throughout the mixture when water is used as an additional pore-forming material.

Combinations of pore-forming materials can be employed with advantage. Thus, for example, when a gas is introduced physically or generated in situ, water is preferably used to supplement the pore-forming activity thereof. This combination of pore-forming materials has the advantage of insuring that the ultimate structure formed by the mixture will be hydrophilic rather than hydrophobic as is characteristic of most polymers of the type contemplated.

The polymerization catalyst may be any of the well known catalysts for the monomeric material that is used. We have found the so-called "rapid accelerators" or redox systems, e.g., mixtures of peroxides with reducing components such as tertiary amines, to be of optimum utility.

It will readily be appreciated by those skilled in the art, in the application of the invention to the preparation of surgical dressings and the like, the term "viscous mixture" refers to a solution, suspension, slurry or paste that has sufficient body to be shaped or molded to the part that is to receive the dressing or otherwise determine the final interior contour of the cast to be formed. Thus, for example, if a surgical dressing is to be applied to a wrist, the texture of the mixture should be such that it can be applied around the wrist with sufficient bulk so that when it hardens it will form a wrist-immobilizing support.

It is within the scope of the method of the invention to enhance the effectiveness with which the polymer and the pore-forming material are distributed throughout the viscous mixture by including one or more emulsifying agents that do not interfere with the polymerization of the monomer. Typical among emulsifying agents that are useful in the method are the stearate, oleate and maleate of triethanolamine.

In certain applications it should be helpful to add plasticizers to the mixture to be polymerized. In order to prepare dresings that have a leather-like characteristic, both the external type of softeners such as the dibutylphthalates and the internal softeners such as the higher esters of acrylic or methacrylic acid are suitable for this purpose.

When special hardness of the finished dressing is a requirement, this may be achieved in accordance with the invention by the addition to the mixture of cross linking, polymerizable compounds such as divinyl benzene, glycol dimethacrylate, or acrylic or methacrylic acid vinyl esters. The use of polymers containing carboxyl groups, as described earlier for the purpose of liberating carbon dioxide from alkali carbonates to effect pore-formation, results in the formation of alkali salts of polymers containing such carboxyl groups. When such polymeric salts are readily soluble in water, dressings containing them tend to become slippery when wet. This can be overcome by coating the surface of the hardened dressing with a solution of the salt of a polyvalent metal such as calcium chloride or aluminum acetate so that upon exchange of the alkali for the polyvalent metal a water insoluble polymerized salt is formed and the dressing is rendered insensitive to water by cross linkage at the surface.

It is also within the scope of the invention to add to the mixture such modifying agents as therapeutic compounds, disinfectants, deodorants and coloring agents, e.g., dyes and pigments. Furthermore, reinforcing materials such as webs of textile fibers, glass and metal may be introduced into the mixture along with inactive fillers, or the like, for increased strength and ease of application. By way of specific example, it has been found most effective, in forming an immobilizing dressing, to pour a viscous mixture into a slotted funnel through which are passed two gauze bandages or strips of muslin having widths corresponding to the length of the slot. As the bandages are pulled out of the slot they carry the foam or foaming mixture along in a layer corresponding approximately to the width of the slot and facilitate wrapping or otherwise applying the mixture around a part of the body to be immobilized. Inasmuch as the polymerization brought about by means of a radical-building catalyst may be inhibited by atmospheric oxygen, it is advisable to cover such a wrapping with a foil or a film-forming substance, e.g., a solution of cellulose ether or polyvinyl alcohol, that is substantially impervious to penetration by air.

It will readily be appreciated by those skilled in the art that the proportions of the various components of the mixture may vary widely depending upon the identity of the components and the conditions under which the mixture is to be applied and the hardened mixture is to be used. The best proportions in any particular instance can readily be determined on the basis of prior experience and by trial and error. As a general guide and without intending to limit the scope of the invention, it is generally desirable that the proportion of water in the mixture be no greater than about 50% by weight inasmuch as higher proportions make it difficult to obtain a mixture of adequate viscosity and interfere with the formation of a polymer having the rigidity and strength ordinarily desired for surgical dressings of the immobilizing type. Proportions of such optional components as therapeutic compounds, deodorants, disinfectants, coloring materials, inactive fillers, and the like, are largely a matter of choice, it being understood of course that they should be present only in minor amounts sufficient to accomplish their intended functions and not in quantities large enough to interfere with the primary objectives of the mixture. The proportion of emulsifying or dispersing agent that is used is of course dependent upon its effectiveness and upon the amount of water or other material that is to be dispersed or distributed as uniformly as possible throughout the mixture. The relative proportions of polymer and monomer, which together should represent at least about 50% by weight of the mixture, should be such as to insure adequate solution or dispersion of the polymer in the monomer without interfering seriously with the polymerization of the monomer at temperatures that can be borne without pain or undue discomfort. As a general guide, relative proportions of the order of one to fifty parts by weight of polymer to ten parts by weight of monomer are considered optimum when the monomer is methylmethacrylate.

The activity of the pore-forming materials or fillers that are active in promoting hydrophilic characteristics in the products of the invention is illustrated by comparing the effect produced by substituting 80 grams of a 5% aqueous pectin solution for an equal amount of water in an emulsified mixture thereof with 40 grams of a bead polymer of methylmethacrylate, 10 grams of methylmethacrylate monomer, a peroxide-tertiary amine catalyst system, and an emulsifying agent. The comparative mixtures were both emulsified by stirring and hardened after five minutes. 68 grams of water were separated from the product prepared with water, leaving a balance of about 15% of the original quantity of water bound in the polymer, whereas between 95 and 98% of the water in the pectin solution of the other product remained in bound form. The bound water was slowly liberated upon heating the products. It was found that the pectin-containing product, after practically complete expulsion of water by heating, was compatible with water whereas the first was not.

The advantages and utility of the method of the invention will become more apparent from the detailed description in the following examples included to illustrate the best mode now contemplated of carrying out the invention. The parts are by weight:

Example 1

A powdery mixture was prepared by mixing:

913 parts polymethylmethacrylate beads,
2 parts benzoyl peroxide,
35 parts sodium bicarbonate, and
50 parts of a copolymer prepared from 65 parts methacrylic acid and 35 parts methylmethacrylate.

The entire mixture was then intimately mixed with:

440 parts methylmethacrylate having
6 parts dimethylaniline dissolved therein,
50 parts water, and
5 parts triethanolamine.

The viscous mixture thus prepared began to foam after one minute and hardened to a porous shaped body after three additional minutes.

Example 2

A powdery mixture was prepared by mixing:

778 parts of copolymer beads prepared from 94% methylmethacrylate and 6% ethylacrylate,
2 parts benzoyl peroxide,
70 parts sodium bicarbonate, and
150 parts of the methacrylic acid-methylmethacrylate copolymer described in Example 1.

The entire mixture was then intimately mixed to a paste with:

244 parts methylmethacrylate having 6 parts dimethyl-p-toluidine dissolved therein,
250 parts water,
50 parts ethanol, and
30 parts triethanolamine.

The paste was poured into a slot funnel through which two lengths of gauze having a width corresponding to that of the funnel were passed. Upon simultaneous withdrawal of the gauze, a strip of foamed and still soft synthetic material covered on both sides with gauze was obtained. The strip was applied to a joint to be immobilized and covered with a film of synthetic resin. It hardened in three to four minutes.

Example 3

A powdery mixture was prepared by mixing:

78.8 grams polymethylmethacrylate beads,
9.5 grams of a copolymer prepared from
65 parts methacrylic acid and
35 parts methylmethacrylate,
6.7 grams $Al_2(SO_4)_3 \cdot 18 H_2O$, and
5.0 grams $NaHCO_3$.

Fifty grams of the mixture were then made into a paste with 30 cc. methylmethacrylate monomer containing a benzoyl peroxide-dimethylaniline catalyst system.

The viscous mixture thus obtained foamed and polymerized to a hardened body in about four minutes. It had a uniform porous structure throughout its cross section and did not become oily upon wetting with water.

Example 4

A powdery mixture was prepared by mixing:

88.3 grams polymethylmethacrylate beads,
6.6 grams $Al_2(SO_4)_3 \cdot 18 H_2O$, and
5.04 grams $NaHCO_3$.

Fifty grams of the mixture were then made into a paste with 30 cc. methylmethacrylate monomer containing a benzoyl peroxide-dimethylaniline catalyst system.

The viscous mixture thus obtained foamed and polymerized to a hardened body in about four minutes. It had a uniform porous structure throughout its cross section and did not become oily upon wetting with water. White aluminum hydroxide gel was formed during production of the foam.

This example shows that an acidic substance such as aluminum sulfate is capable of reacting with sodium bicarbonate to split off carbon dioxide for foaming even in the absence of a polymer, such as the copolymer of methacrylic acid and methylmethacrylate, containing acid groups. The aluminum hydroxide in the hardened structure is believed to contribute to its hydrophilic characteristics.

Example 5

An unfoamed, but hydrophilic plastic structure was prepared by polymerizing a mixture of:

40 grams polymethylmethacrylate,
20 grams of a 5% aqueous solution of a copolymer of 65 parts methacrylic acid and 35 parts methylmethacrylate, and
12 grams methylmethacrylate monomer containing a benzoyl peroxide-dimethylaniline catalyst system.

The water bound in the hardened structure was gradually released upon storage, as indicated by its weight.

|  | Grams |
|---|---|
| (a) Directly after curing | 69 |
| (b) After 3½ hours storage | 65 |
| (c) After 21½ hours storage | 60 |
| (d) After 48 hours storage | 54 |

It is to be expected that numerous modifications will readily become apparent to those skilled in the art upon reading this description. Thus, for example, the polymerization can be carried out by heating the mixture, if desired by irradiation with ultraviolet light, instead of or in conjunction with the use of a catalyst or catalyst system. All such modifications are intended to be included within the scope of the invention as defined in the appended claims.

We claim:

1. A porous, hydrophilic resin prepared by hardening, in the presence of a redox catalyst system, a mixture of (A) methylmethacrylate monomer with (B) about 1 to 50 parts by weight of a member of the group consisting of methylmethacrylate homopolymer, methylmethacrylate-ethylacrylate copolymer and mixtures thereof per 10 parts by weight of monomer, (C) a hydrophilic pore-forming liquid selected from the group consisting of water and a mixture of water with a low molecular weight alcohol, and (D) a carboxylic acid group-containing copolymer of methylmethacrylate and methacrylic acid, components (A) and (B) representing at least about 50% by weight of the mixture.

2. A resin as defined in claim 1 wherein component (D) is a copolymer of methacrylic acid and methylmethacrylate in a weight ratio of about 65:35.

3. A resin as defined in claim 1 wherein gelatin is used in addition to component (C).

4. A resin as defined in claim 1 wherein alginic acid is used in addition to component (C).

5. A resin as defined in claim 1 wherein pectin is used in addition to component (C).

6. A method for preparing a porous, hydrophilic resin which comprises forming a mixture of (A) methylmethacrylate monomer, (B) about 1 to 50 parts by weight of a member of the group consisting of methylmethacrylate polymer and copolymers per 10 parts by weight of monomer, (C) a hydrophilic pore-forming liquid selected from the group consisting of water and a mixture of water with a low molecular weight alcohol, (D) a carboxylic acid group-containing copolymer of methylmethacrylate and methacrylic acid, components (A) and (B) representing at least about 50% by weight of the mixture, and hardening said mixture by polymerization in the presence of a redox catalyst system.

7. A resin as defined in claim 1 wherein the polymer of component B is polymethylmethacrylate.

8. A resin as defined in claim 1 wherein the polymer of component B is a copolymer of methylmethacrylate and ethylacrylate.

9. A resin as defined in claim 1 wherein the redox catalyst system comprises a peroxide and a tertiary amine.

10. A resin as defined in claim 1 wherein the catalyst is a redox system comprising benzoyl peroxide and dimethyl-p-toluidine.

11. A resin as defined in claim 1 wherein the catalyst is a redox system comprising benzoyl peroxide and dimethylaniline.

References Cited in the file of this patent

UNITED STATES PATENTS

| | | |
|---|---|---|
| 2,447,055 | Cooper | Aug. 17, 1948 |
| 2,548,438 | McLoughlin | Apr. 10, 1951 |
| 2,681,321 | Stastny et al. | June 15, 1954 |
| 2,783,215 | Robitschek et al. | Feb. 26, 1957 |

FOREIGN PATENTS

| | | |
|---|---|---|
| 652,770 | Great Britain | May 2, 1951 |